(12) United States Patent
Asano et al.

(10) Patent No.: US 6,436,493 B1
(45) Date of Patent: Aug. 20, 2002

(54) GLASS PANEL

(75) Inventors: Osamu Asano, Nagaokakyo; Hiroshi Inoue, Kyoto, both of (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/529,888

(22) PCT Filed: Sep. 8, 1999

(86) PCT No.: PCT/JP99/04894
§ 371 (c)(1),
(2), (4) Date: Apr. 20, 2000

(87) PCT Pub. No.: WO00/17124
PCT Pub. Date: Mar. 30, 2000

(30) Foreign Application Priority Data

Sep. 17, 1998 (JP) .......................................... 10-262828

(51) Int. Cl.[7] ................................................. E06B 3/24
(52) U.S. Cl. .................... 428/34; 428/192; 52/786.1; 52/786.13
(58) Field of Search .......................... 428/34, 192, 150, 428/172, 410; 52/786.1, 786.13

(56) References Cited

U.S. PATENT DOCUMENTS

| 4,768,813 | A |   | 9/1988  | Timmons            |
|-----------|---|---|---------|--------------------|
| 4,895,397 | A |   | 1/1990  | Miller             |
| 5,643,644 | A | * | 7/1997  | Demars ....... 428/34 |
| 5,908,675 | A | * | 6/1999  | Marquardt et al. ....... 428/34 |
| 5,989,659 | A | * | 11/1999 | Kato et al. ....... 428/34 |

FOREIGN PATENT DOCUMENTS

| FR | 2129199   | 10/1972 |
|----|-----------|---------|
| GB | 2111153   | 6/1983  |
| JP | 59045947  | 3/1984  |
| JP | 01224248  | 9/1989  |

OTHER PUBLICATIONS

Microfilm of the specification and drawings annexed to request of JP Utility Model Appln. No. 029497/1973 (Laid-open No. 135455/1974 (Masashi Misumi).

* cited by examiner

Primary Examiner—Donald J. Loney
(74) Attorney, Agent, or Firm—Fulbright & Jaworski L.L.P.

(57) ABSTRACT

A glass panel includes a pair of glass sheets (1A, 1B) having sheet faces thereof opposed to each other across a void (V) therebetween and having peripheral edges thereof bonded to each other with low-melting glass (3) to seal the void. A bonded face (5) of the glass sheet to be bonded with the low-melting glass forms a rough surface portion (8) which extends along substantially the entire peripheral edge thereof

4 Claims, 7 Drawing Sheets

GLASS PANEL

TECHNICAL FIELD

The present invention relates to a glass panel including a pair of glass sheets having sheet faces thereof opposed to each other across a void therebetween and having peripheral edges thereof bonded to each other with low-melting glass to seal the void.

BACKGROUND ART

The glass panel described above includes a sealed void formed between the glass sheets for higher heat insulating performance. Conventionally, bonded faces of the respective glass sheets to be bonded with the low-melting glass are formed as flat smooth faces over the entire surfaces thereof With the above-described glass panel, when the peripheral edges of the two glass sheets are to be bonded with the low-melting glass, it is necessary to heat the low-melting glass together with the glass sheets to be fused to the peripheral edges of the sheets. In this, if the temperature distribution becomes non-uniform in the sheet-face direction or thickness direction of the glass sheets, an internal stress will be developed in the glass sheets, which stress tends to detach the low-melting glass and the glass sheets from each other.

Further, in case the void is depressurized to increase the heat-transfer resistance, a tensile stress will be developed between the low-melting glass and the glass sheets under the effect of the atmospheric pressure, which stress also tends to detach the low-melting glass and the glass sheets from each other.

For this reason, it becomes necessary to increase the bonding force by increasing the bonding surface areas of the low-melting glass and the glass sheets. However, in the case of the conventional glass panel described above, the bonded faces are formed as flat smooth faces over the entire surfaces thereof Then, in order to increase the bonding surface area, it is necessary to increase the width of these bonding surface areas, thus requiring a large amount of low-melting glass.

Especially, when the bonding is effected by introducing the low-melting glass between the sheet faces of the two glass sheets, the areas of the glass sheets opposing to the void will be decreased so as to increase the amount of heat conduction between the glass sheets, thus impairing the heat insulating performance.

The present invention has been made in view of the above-described state of the art, and it object is to achieve increased bonding force between the low-melting glass and the glass sheets when the bonding is effected by introducing the low-melting glass between the sheet faces of the glass sheets while decreasing the amount of the low-melting glass required without impairing the heat insulating effect.

DISCLOSURE OF THE INVENTION

According to the characterizing feature of the present invention relating to claim 1, a glass panel includes a pair of glass sheets having sheet faces thereof opposed to each other across a void therebetween and having peripheral edges thereof bonded to each other with low-melting glass to seal the void, wherein a bonded face of the glass sheet to be bonded with the low-melting glass forms a rough surface portion which extends along substantially the entire peripheral edge thereof.

That is, by forming, in the bonded face, a rough-surface portion extending along the entire peripheral edge, the bonding surface area between the low-melting glass and the glass sheets may be increased without markedly increasing the width dimension of the bonded face.

Therefore, it is possible to increase the bonding force between the low-melting glass and the glass sheets when the bonding is effected by introducing the low-melting glass between the sheet faces of the glass sheets while decreasing the amount of the low-melting glass required without impairing the heat insulating effect.

Further, according to the characterizing feature of the present invention relating to claim 2, a glass panel includes a pair of glass sheets having sheet faces thereof opposed to each other across a void therebetween and having peripheral edges thereof bonded to each other with low-melting glass to seal the void, at least one of the glass sheets including a function-imparting film in the sheet face thereof opposing to the other glass sheet, wherein a bonded face of the one glass sheet including the function-imparting film to be bonded with the low-melting glass forms a rough surface portion which extends substantially along the entire peripheral edge thereof, the rough surface portion having a portion where said low-melting glass comes into direct contact with said one glass sheet.

That is, by forming, in the bonded face of the glass sheet having the function-imparting film, a rough-surface portion extending along the entire peripheral edge, the bonding surface area between the low-melting glass and the glass sheets may be increased without markedly increasing the width dimension of the bonded face.

Further, the rough surface portion having a portion where the low-melting glass comes into direct contact with the one glass sheet is formed in the bonded sheet face of this glass sheet having the function-imparting film, even when the portion of the rough surface portion is formed of the additional function-imparting film and a portion of the low-melting glass directly contacts the function-imparting film, the remaining portion of the low-melting glass may be bonded directly with the glass sheets, so as to assure the bonding force between the one glass sheet having the function-imparting film and the low-melting glass.

Therefore, it is possible to increase the bonding force between the low-melting glass and the glass sheets when the bonding is effected by introducing the low-melting glass between the sheet faces of the glass sheets while decreasing the amount of the low-melting glass required without impairing the heat insulating effect.

According to the characterizing feature of the present invention relating to claim 3, the rough surface portion comprises an elongate groove formed along the peripheral edge.

That is, the bonding may be effected such that the bonding area between the low-melting glass and the glass sheets is increased in the direction of width of the bonded face and also that the low-melting glass and the glass sheets are retained in the direction of width of the bonded face.

Moreover, the bonding length between the low-melting glass and the bonded face of the glass sheet along the width direction may be increased.

Therefore, it becomes possible to effectively prevent detachment between the low-melting glass and the glass sheets along the width direction of the bonded face, in particular, such detachment along the width direction of the bonded face due to shearing and also to restrict invasion of outside air into the void along the width direction of the bonded face.

According to the characterizing feature of the present invention relating to claim 4, said bonded face includes said rough surface portion and a smooth surface portion formed adjacent said rough surface portion.

That is, the rough surface portion may contribute to increased bonding force between the low-melting glass and the glass sheets, whereas the smooth surface portion may contribute to increased adherence between the low-melting glass and the glass sheets.

Therefore, it becomes possible to reliably prevent detachment between the low-melting glass an the glass sheets and also invasion of outside air into the void.

BEST MODE OF EMBODYING THE INVENTION

Embodiments of the present invention will be described next with reference to the accompanying drawings.

First Embodiment

Figure 1:
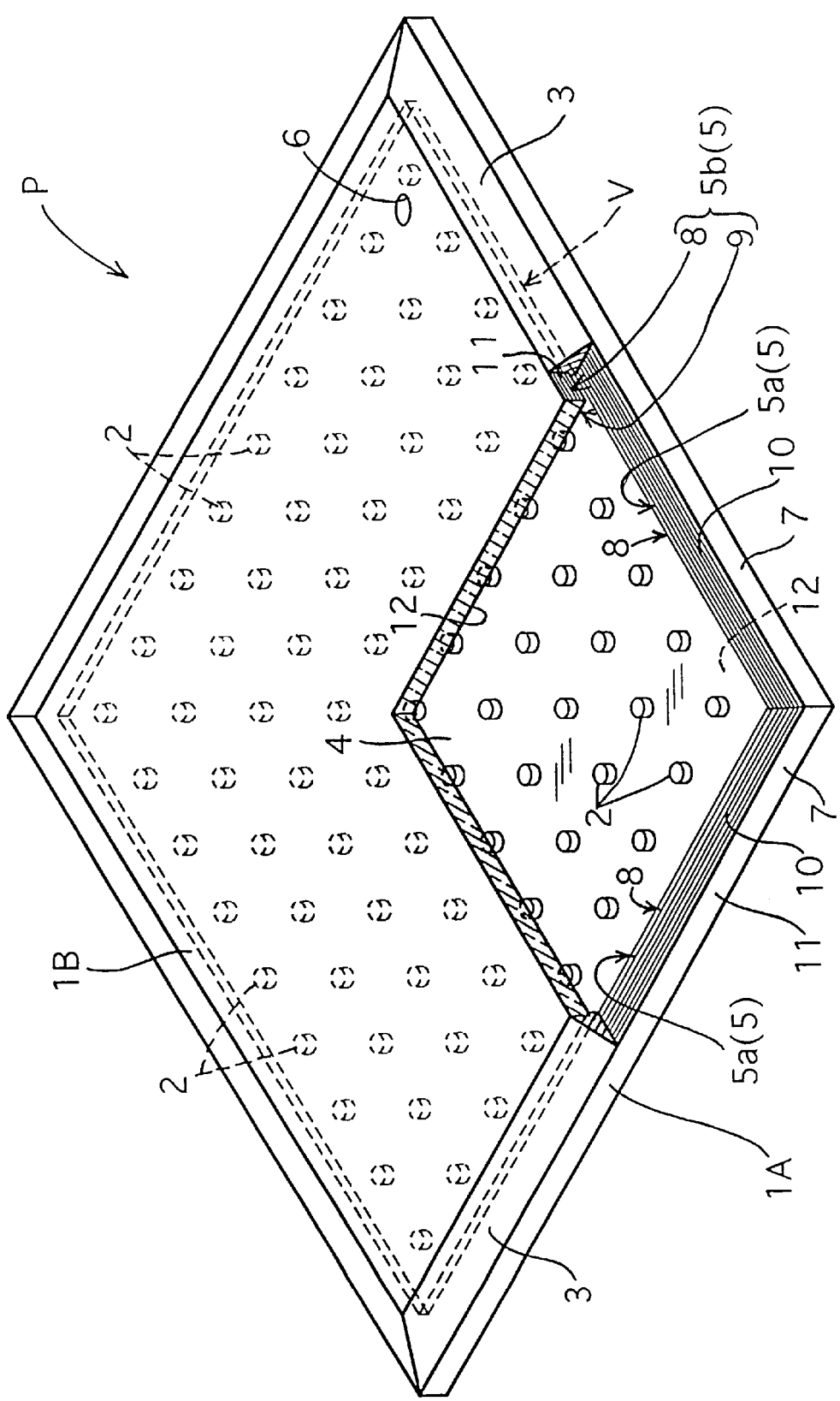
FIG. 1 is a partially cutaway perspective view of a glass panel.
Figure 2:
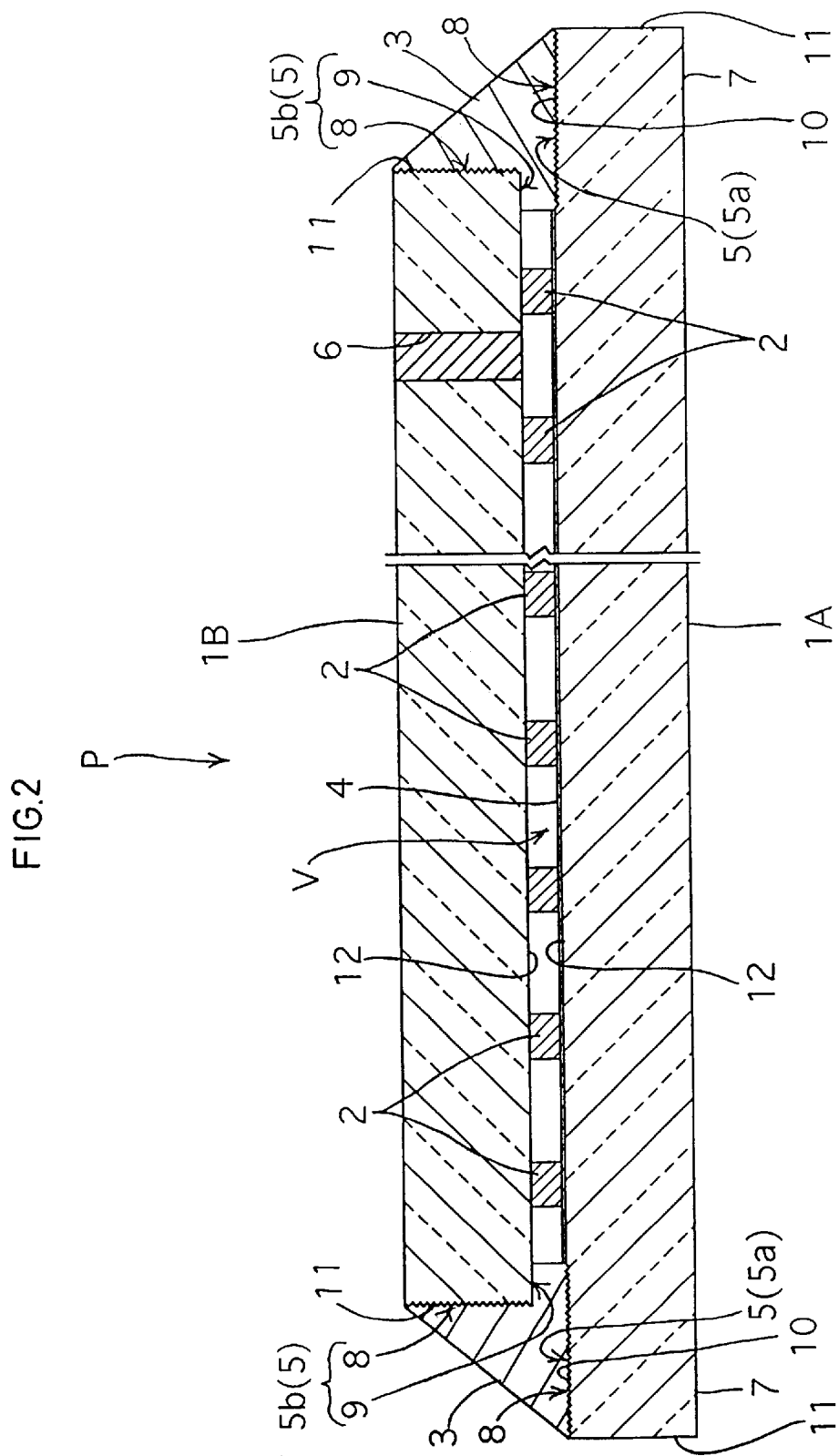
FIG. 2 is a section view of the glass panel.

FIGS. 1 and 2 shows a glass panel P including a pair of glass sheets 1A, 1B having sheet faces 12 opposed to each other across a number of metal spacers 2 to form a void V therebetween, with peripheral edges of the glass sheets 1A, 1B being bonded together with a low-melting glass 3 so as to seal the void V.

Each of the two glass sheets 1A, 1B is a transparent float plate glass having thickness of about 3 mm. On an inner face of the one glass sheet 1A facing the void V with leaving a bonded face 5 to be described later, there is attached an infrared reflecting metal thin film (example of a "function-imparting film") 4 by means of sputtering, evaporation, chemical evaporation (CVD), or the like.

The void V is formed to provide a depressurized condition ($1.0 \times 10^{-2}$ torr or lower, or preferably, $1.0 \times 10^{-4}$ torr or lower) by e.g. manufacturing the glass panel under vacuum environment or by removing air from the void V after forming this void V between the two glass sheets 1A, 1B.

In case the depressurized condition of the void V is realized by removing the air therefrom, it is necessary to provide a suction portion 6 having a through hole for allowing air suction and depressurization of the void V in either one of the glass sheets 1A, 1B or the sealing low-melting glass 3.

The one glass sheet (to be referred to as "infrared reflecting glass sheet") 1A having the metal thin film 4 is sized to be slightly larger than the other glass sheet 1B so that when the sheet faces 12 of these glass sheets 1A, 1B are disposed in opposition to each other, the peripheral edge of the one glass sheet 1A projects beyond that of the other glass sheet 1B in the direction along the sheet faces 12 to form a projecting portion 7, on which the low-melting glass 3 is placed to seal the outer periphery of the void V.

Figure 3:
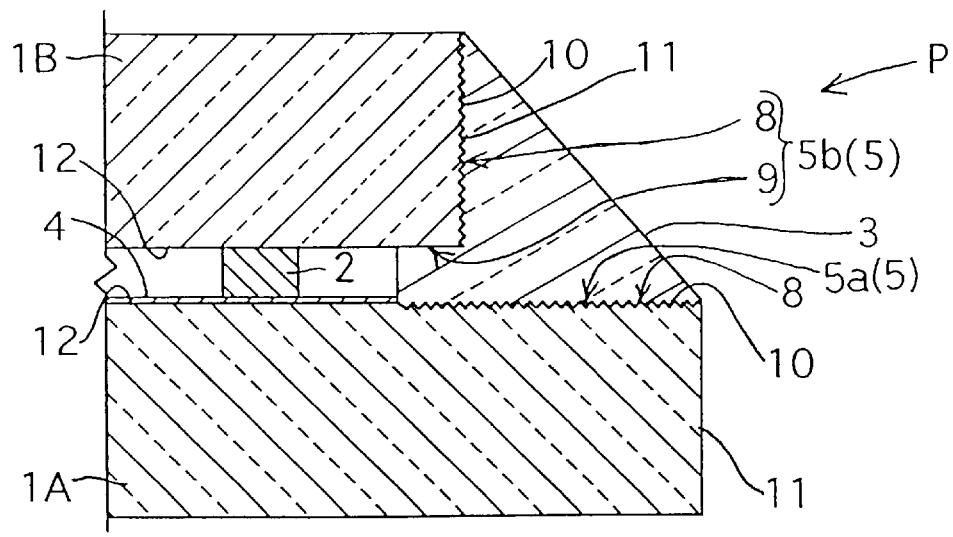
FIG. 3 is an enlarged cross section of principal portions.

The bonded faces 5 of the respective glass sheets 1A, 1B to be bonded with the low-melting glass 3 are provided along the entire peripheral edges of the respective glass sheets 1A, 1B. Specifically, as shown in FIG. 3, the bonded face 5a of the infrared reflecting glass sheet 1A consists solely of a rough surface portion 8 which is formed by removing, by abrasion, the peripheral edge portion of the metal thin film 4 attached in advance over the entire surface of the sheet face 12 by a width of 5–10 mm and through which the low-melting glass 3 comes into direct contact with the glass sheet 1A over the entire surface. The bonded face 5b of the other glass sheet 1B consists of a smooth surface portion 9 which is formed of the sheet face 12 formed smooth as so made originally and of a rough surface portion 8 which is formed in a cut end face 11 located adjacent the smooth surface portion 9. Then, the two glass sheets 1A, 1B are bonded together by introducing the low-melting glass 3 between the respective sheet faces 12 thereof.

Figure 4:
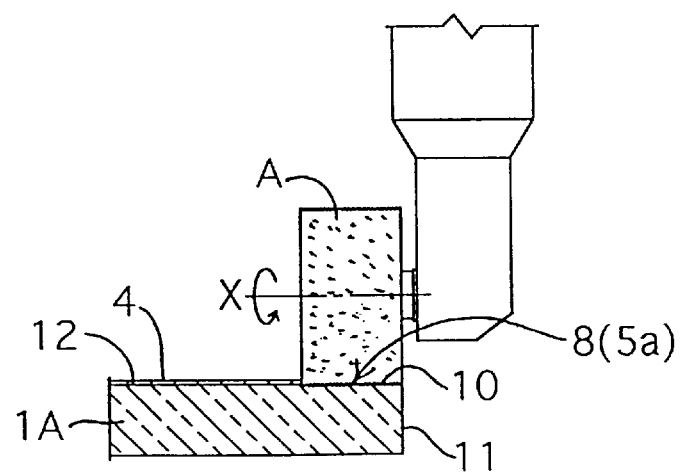
FIG. 4 is a section of principal portions illustrating a method of forming a rough surface portion.

For forming the bonded face 5a of the infrared reflecting glass sheet 1A, as illustrated in FIG. 4, a rotary grindstone A is rotated continuously about an axis X parallel to the sheet face 12 and normal to the end face 11 and moved at the same time along the peripheral edge, so as to form a number of small elongate grooves 10 elongated along the peripheral edge and having a depth of 1 to 100μm, whereby the rough surface portion 8 is formed along the entire peripheral edge.

Figure 5:
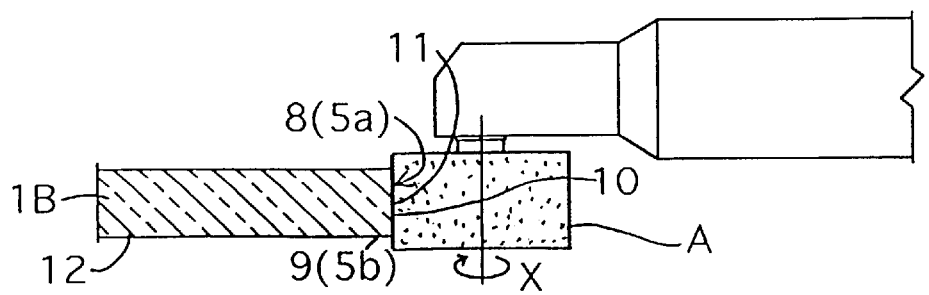
FIG. 5 is a section of principal portions illustrating a method of forming a rough surface portion.

Also, as for the rough surface portion 8 constituting the bonded face 5b of the other sheet glass 1B, as shown in FIG. 5, the rotary grindstone A is rotated continuously about the axis X parallel to the end face 11 and normal to the sheet face 12 and moved at the same time along the peripheral edge, so as to form a number of small elongate grooves 10 elongated along the peripheral edge and having a depth of 1 to 100 μm.

Figure 6:
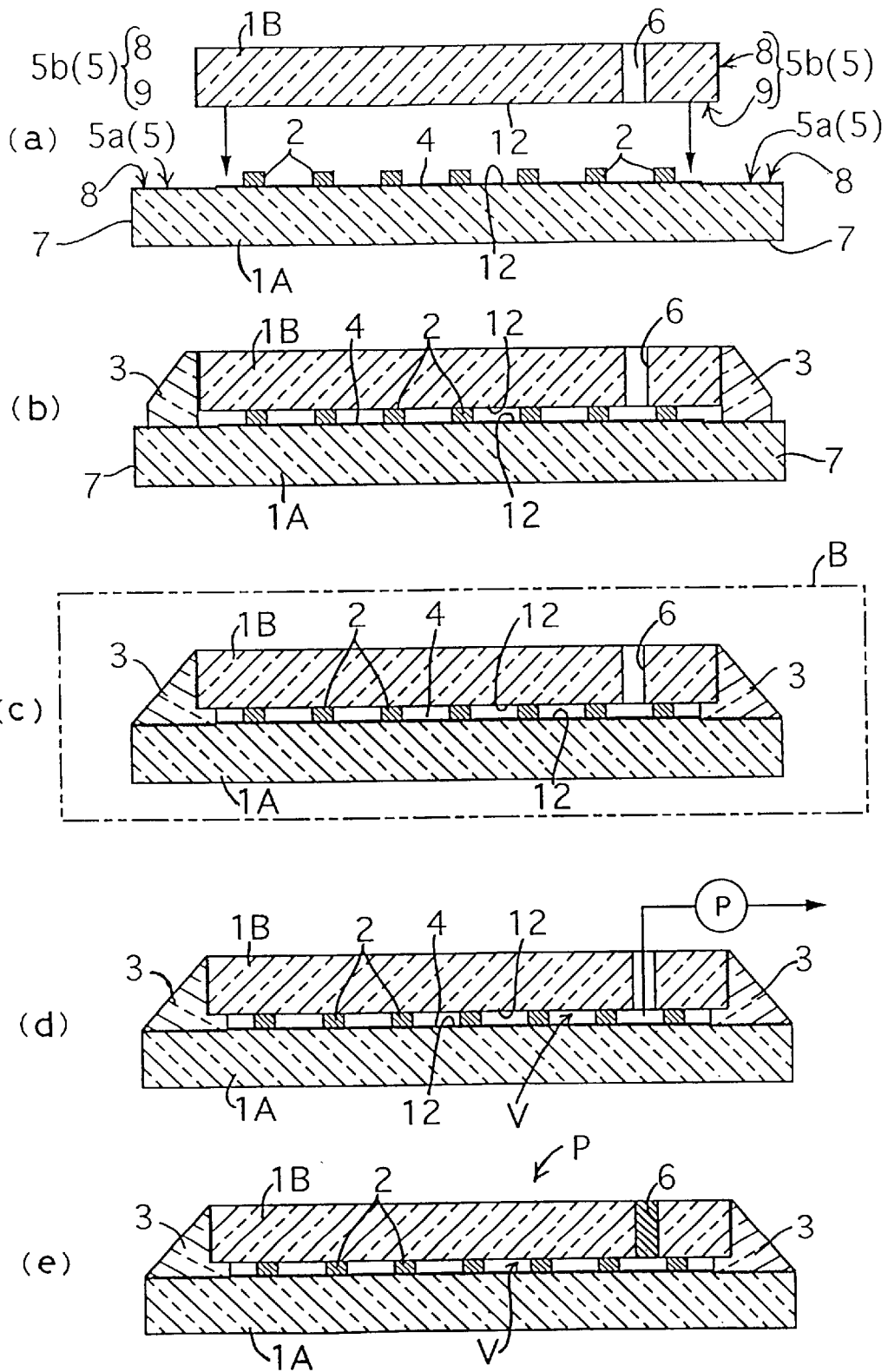
FIG. 6 is a section of principal portions illustrating a manufacturing method.

Next, with reference to FIG. 6, there will be described a process for manufacturing the glass panel P under the atmospheric pressure environment. However, the invention is not limited to this process, but may employ any other process.

[1] First, the infrared reflecting glass sheet 1A to which the bonded face 5a is attached in advance is supported with its bonded face 5a being oriented upward, so that a number of spacers 2 will be disposed with a predetermined spacing therebetween on this upward-oriented sheet face 12. Then, the other glass sheet 1B in which a suction portion 6 is formed in advance is placed on these spacers 2, so as to superpose the glass sheets 1A, 1B vertically. Then, the low-melting glass 3 is applied to the projecting portion 7 of the infrared reflecting glass sheet 1A (see FIGS. 6(a), (b)).

Incidentally, the other glass sheet 1B may be superposed after the low-melting glass 3 is applied to the projecting portion 7 of the infrared reflecting glass sheet 1A.

[2] Thereafter, these two glass sheets 1A, 1B are heated in a heating furnace B to a temperature higher than the fusing point of the low-melting glass 3, so as to fuse this low-melting glass 3. Then, this assembly is cooled back to the room temperature, so that the solidified low-melting glass 3 seals the outer periphery of the void V (see FIG. 6(c)).

[3] Then, air is removed through the suction portion 6 from the inside of the void V and then this suction portion 6 is sealed (see FIGS. 6(d) and (e)).

Incidentally, when the glass panel P is manufactured under a depressurized environment, though not shown, the other glass sheet 1B without the suction portion 6 will be used. And, two glass sheets 1A, 1B superposed via the spacers 2 therebetween will be heated under the depressurized environment within a vacuum furnace, so as to fuse the low-melting glass 3. Then, the assembly is cooled back to the room temperature, so that the solidified low-melting glass 3 will seal the outer periphery of the void V under the depressurized condition.

Second Embodiment

Figure 7:
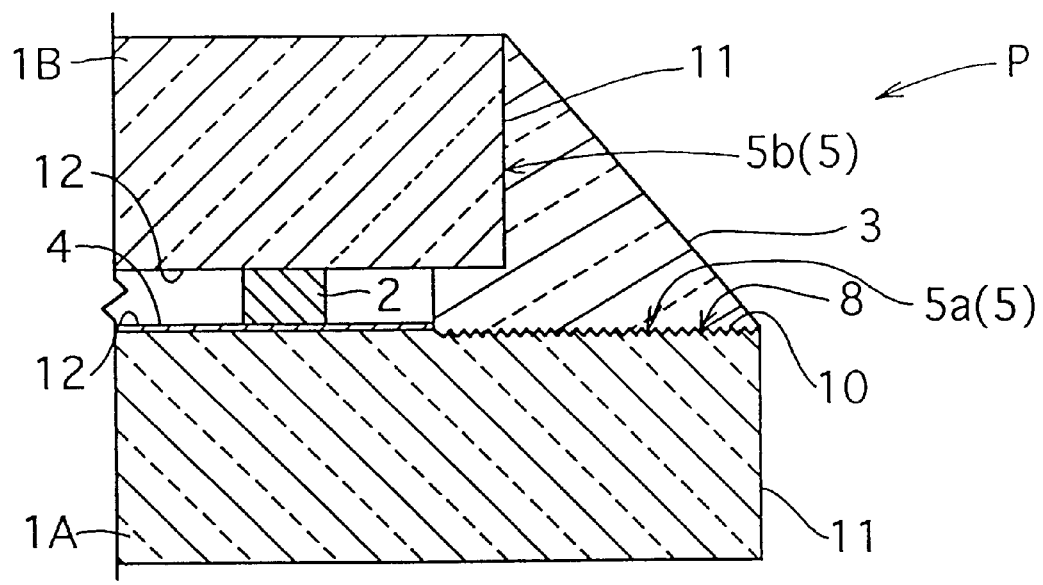
FIG. 7 is an enlarged section of principal portions showing a second embodiment.

FIG. 7 shows a further embodiment of a bonded face 5 to be bonded with the low-melting glass 3 for sealing the glass sheets 1A, 1B. In this case too, by using a rotary buff mixed with an abrasive compound, the rough surface portion 8 is formed only in the bonded face 5a of the infrared reflecting glass sheet 1A.

The rest of the construction is same as the first embodiment.

Tests were conducted on the glass panel P according this embodiment and other glass panels in which the rough surface portion 8 was not formed in any of the glass sheets constituting the panels so check whether detachment would occur or not when the void V formed under the atmospheric pressure environment was being depressurized.

Specifically, in each one of total fifty infrared reflecting glass sheets 1A having the outer dimensions of: 800 mm×600 mm, the rough surface portion 8 was formed in the width of 10 mm from the four side edges of the rectangle by using a rotary buff. Then, with using each one of these, the void V was formed with the other glass sheet 1B having the outer dimensions of: 794 mm×594 mm with the spacers 2 interposed therebetween and the peripheral edges of the two glass sheets 1A, 1B were sealed together with the low-melting glass 3. In this manner, 50 (fifty) units of first test panels were produced.

Next, each one of total fifty infrared reflecting glass sheets having the outer dimensions: 800 mm×600 mm, but this time without the rough surface portions 8, was assembled with the other glass panel having the outer dimensions: 794 mm×594 mm with the spacers 2 being interposed therebetween to form the void V and the peripheral edges of the glass sheets were bonded together with the low-melting glass. In this manner, 50 (fifty) units of second test panels were produced.

Incidentally, all of the above-described test panels were subjected to a same heating process of 450° C. for 30 minutes so as to fuse the low-melting glass to bond the peripheral edges of the glass sheets together.

Thereafter, for each of these test panels, its void V was depressurized by means of a vacuum pup through the suction portion 6 formed in the glass sheet.

Respecting the first test panels with formation of the rough surface portion 8, with all of the fifty panels, the depressurizing operations of the void V were successfully carried out without any detachment between the interfaces of the low-melting glass and the glass sheets.

On the other hand, in the case of the second test panels without formation of the rough surface portion 8, with four of the fifty panels, the operation failed instantly when the depressurizing operation was started with the vacuum pump as detachment developed between the interfaces of the low-melting glass and the glass sheets.

Figure 8:
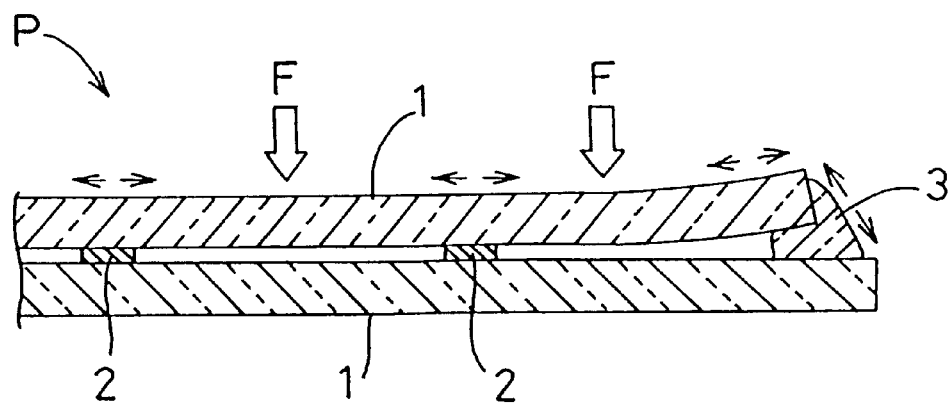
FIG. 8 is an explanatory view of a detachment phenomenon.

This is because, as illustrated in FIG. 8, when the atmospheric pressure F is applied to the glass panel P, this exerted a mutually detaching moment to the ends of the sheets, so that the bonding between the glass sheets 1 and the low-melting glass 3 may readily fail if the bonding force is insufficient.

Third Embodiment

Figure 9:
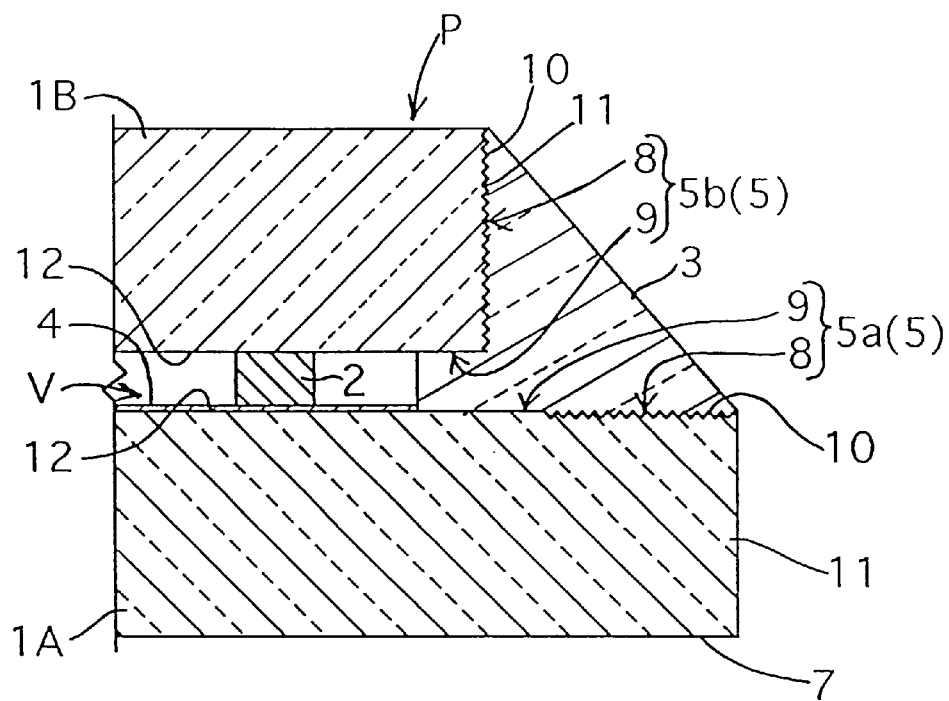
FIG. 9 is an enlarged section of principal portions showing a third embodiment.

FIG. 9 shows a still further embodiment of a bonded face 5 to be bonded with the low-melting glass 3 for sealing the glass sheets 1A, 1B together.

In this embodiment, in forming the bonded face 5a by abrading the peripheral edge of the metal thin film 4 attached to the infrared reflecting glass sheet 1A by means of a rotary grindstone A, the outer peripheral portion of the peripheral edge of the metal thin film 4 is abraded in the same manner as the first embodiment so as to form the rough surface portion 8 extending along the entire peripheral edge, while the inner peripheral portion of the peripheral edge of the metal thin film 4 is abraded by means of a polishing member such as green Carborundum to form a mirror face, which provides a smooth surface portion 9 located adjacent the rough surface portion 8 and extending along the entire peripheral edge.

The rest of the construction is same as the first embodiment.

Fourth Embodiment

Figure 10:
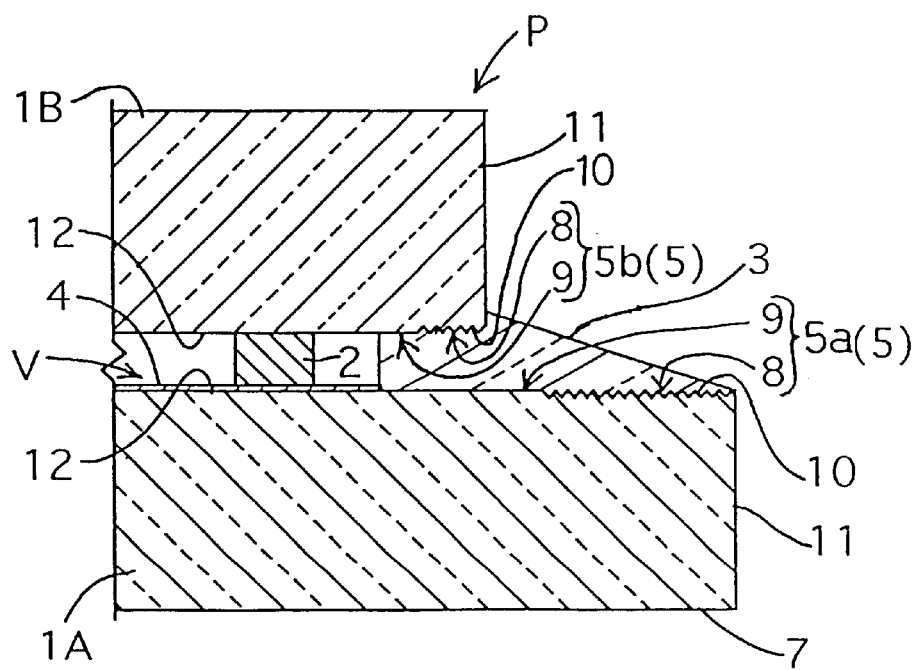
FIG. 10 is an enlarged section of principal portions showing a fourth embodiment.

FIG. 10 shows a still further embodiment of the bonded face 5a to be bonded with the low-melting glass 3 for sealing the glass sheets 1A, 1B together.

In this embodiment, the bonded face 5 of the infrared reflecting glass sheet 1A consists of a rough surface portion 8 and a smooth surface portion 9 like those of the second embodiment. Whereas, the bonded face 5a of the other glass sheet 1B consists of a smooth surface portion 9 which is formed of the smooth sheet face 12 as originally manufactured and a rough surface portion 8 formed in the outer periphery thereof by means of e.g. a rotary grindstone.

The rest of the construction is same as the first embodiment.

Fifth Embodiment

Figure 11:
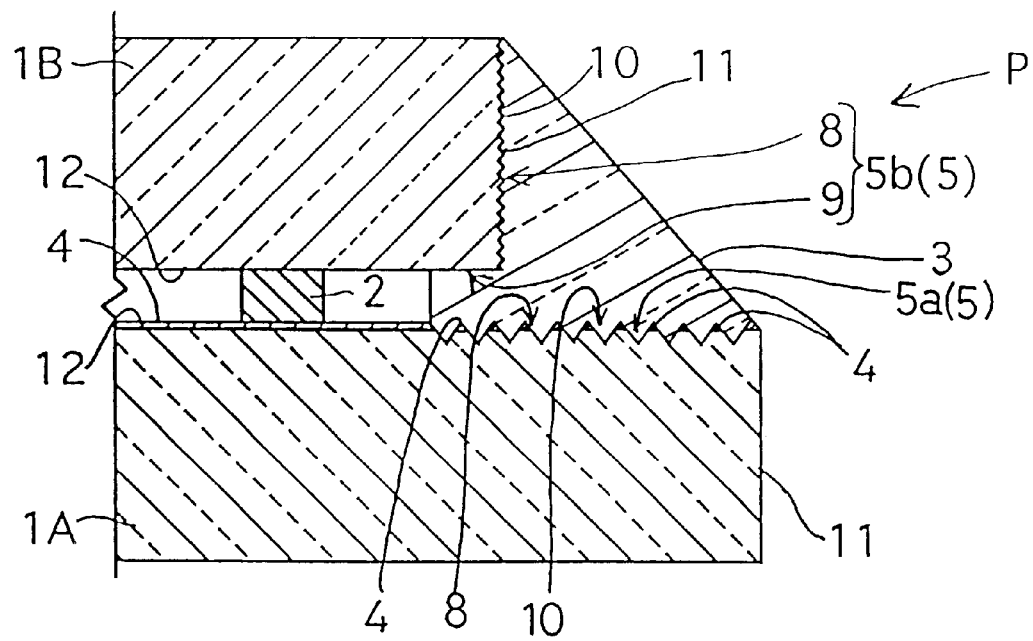
FIG. 11 is an enlarged section of principal portions showing a fifth embodiment.

FIG. 11 shows a still further embodiment wherein a number of deep elongate grooves 10 are cut in the width of 5 to 10 mm in the peripheral edge of the metal thin film 4 attached in advanced over the entire sheet face 12 of the infrared reflecting glass sheet 1A so as to remove the metal thin film 4 roughly, so that the bonded face 5a of the infrared reflecting sheet glass 1A is formed as a rough surface portion which includes, alternately in the width direction, a portion where the low-melting glass 3 comes into direct contact with the glass sheet 1A and a further portion where the glass comes into direct contact with the metal thin film 4.

The rest of the construction is same as the first embodiment.

Sixth Embodiment

Figure 12:
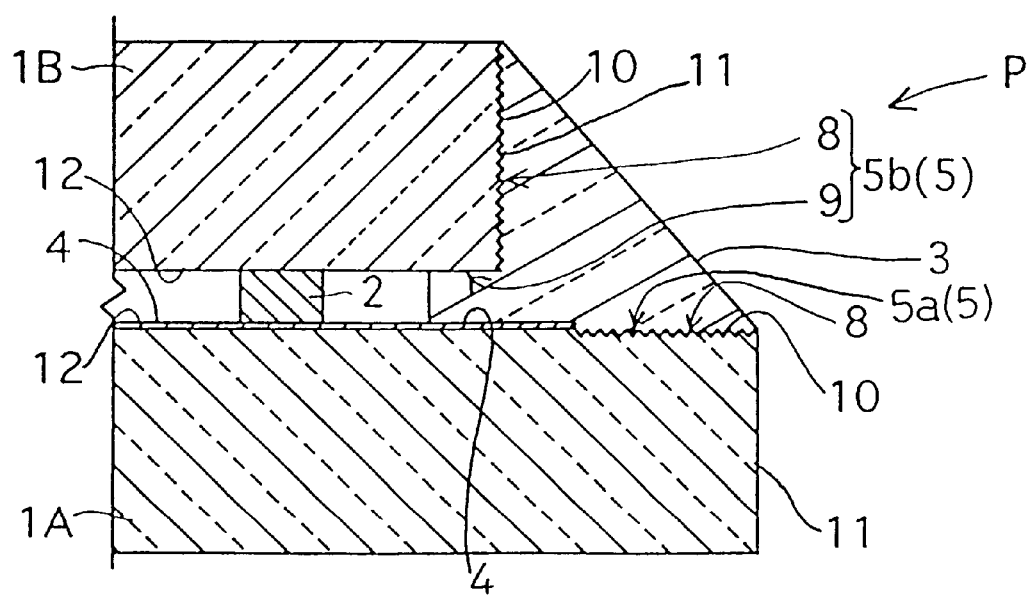
FIG. 12 is an enlarged section of principal portions showing a sixth embodiment.

FIG. 12 shows a still further embodiment wherein the peripheral edge of the metal thin film 4 attached in advance over the entire sheet face 12 of the infrared reflecting glass sheet 1A is removed by cutting entirely in the width of about 5 mm, so as to form the bonded face 5a of the infrared reflecting sheet glass 1A which includes a portion where the low-melting glass 3 comes into direct contact with the glass sheet 1A and a further portion in which a portion of the metal thin film 4 is embedded for the glass to come into direct contact with the metal thin film 4.

The rest of the construction is same as the first embodiment.

Other Embodiments

<1> The rough surface portion to be formed in the bonded face may be in the form of a number of convex and concave portions distributed in random.

<2> The rough surface portion to be formed in the bonded face may be in the form of one elongate groove which extends continuously along the entire peripheral edge.

<3> The rough surface portion to be formed in the bonded face may be in the form of a single elongate groove.

<4> The rough surface portion to be formed in the bonded face may be formed by such method as sand blasting, etching and so on.

<5> The bonded face may consist of a plurality of rough surface portions and smooth surface portions arranged alternately in the width direction.

<6> In the glass panel relating to the present invention, its bonded face may be formed of the cut end faces of the two glass sheets.

<7> In the glass panel relating to the present invention, the rough surface portion may be formed only in the bonded face of one of the pair of glass sheets, while the bonded face of the other glass sheet may be formed entirely as the smooth surface portion.

<8> In the glass panel relating to the present invention, the function-imparting films may be attached to the opposing faces of the two glass sheets disposed in opposition to each other. And, the function-imparting film may impart any other function than the infrared reflection such as ultraviolet reflection, infrared absorption, ultraviolet absorption, etc.

<9> The glass sheets to be employed in the glass panel relating to the present invention are not limited to those described in the foregoing embodiments having the thickness specified hereinbefore. Sheet glasses having other thickness may be employed also.

<10> The glass panel relating to the present invention may be a glass panel in which the void is formed between the glass sheets having the function-imparting film or may also be a glass panel in which the void is formed between the glass sheets without the function-imparting film. And, these glass sheets may be figured glass, frosted glass (glass provided, through a surface treatment thereof, with the function of diffusing light), wired glass, tempered glass, or any combinations of these.

<11> Further, as for the composition of the glass, it may be sodium silicate glass (soda lime silica glass), boric silicate glass, aluminosilicate glass, or various kinds of crystallized glass.

<12> The invention is not limited to the use of the combination in which one glass sheet and the other glass sheet have different lengths or widths. It is also possible to use glass sheets having the same dimensions. And, the superposing manner of the glass sheets may alternatively be such that the peripheral edges thereof are superposed in alignment with each other. Further, the glass panel may be constructed by assembling one particular glass sheet and another glass sheet which differs in the thickness thereof.

INDUSTRIAL APPLICABILITY

The glass panel relating to the present invention may be used for a variety of applications. For example, it may be used for buildings, vehicles (windowpane of automobile, windowpane of railway cars, windowpane of ship), instrument components (surface glass of a plasma display, door or wall of a refrigerator, door or wall of a heat reserving device).

What is claimed is:

1. A glass panel comprising:

a pair of glass sheets having sheet faces thereof opposed to each other across a void therebetween and having peripheral edges thereof bonded to each other with low-melting glass to seal the void;

at least one of the glass sheets including a function-imparting film in the sheet face thereof opposing to the other glass sheet, said one glass sheet including the function-imparting film forming, at a peripheral edge thereof, a rough surface portion to be bonded with the low-melting glass;

wherein said rough surface portion comprises an elongate groove formed by cutting along said peripheral edge while removing said function-imparting film.

2. A glass panel as defined in claim 1, wherein said elongate groove has a depth of from 1 to 100 $\mu$m.

3. A glass panel comprising:

a pair of glass sheets having sheet faces thereof opposed to each other across a void therebetween and having peripheral edges thereof bonded to each other with low-melting glass to seal the void, at least one of the glass sheets forming, at a peripheral edge thereof, a rough-surface portion to be bonded with said low-melting glass;

wherein one of the glass sheets is sized to be larger than the other glass sheet, with the peripheral edge of the one glass sheet projecting beyond that of the other glass sheet in a direction along the sheet faces; and said rough surface portion comprises an elongate groove formed by cutting along said peripheral edge of said larger glass sheet.

4. A glass panel as defined in claim 3 where in said elongate groove has a depth of from 1 to 100 $\mu$m.

* * * * *